Feb. 26, 1963   M. M. McLANE   3,079,239
SODIUM CYANIDE PRODUCTION
Filed Dec. 22, 1959
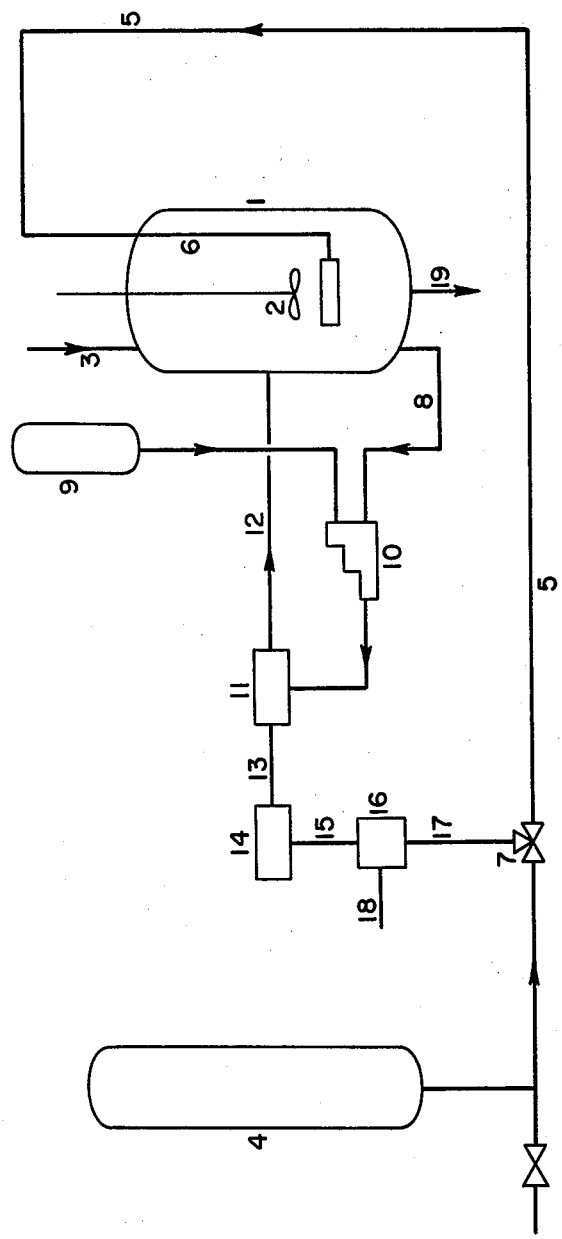
INVENTOR.
Martin M. McLane
BY Elizabeth V. Fitzgerald
AGENT

3,079,239
SODIUM CYANIDE PRODUCTION

Martin M. McLane, Texas City, Tex., assignor to Monsanto Chemical Company, St. Louis, Mo., a corporation of Delaware
Filed Dec. 22, 1959, Ser. No. 861,362
1 Claim. (Cl. 23—230)

The present invention relates to the production of sodium cyanide and, more particularly, to the production of aqueous solutions of sodium cyanide.

In recent years, the commercial demand for hydrogen cyanide, long a slow-moving product, has increased steadily stimulated by the advent and wide acceptability of such products as acrylonitrile fibers and nylon. A sizable quantity of the hydrogen cyanide being produced is marketed in the form of an aqueous solution (about 30%) of sodium cyanide. The solution has certain advantages over gaseous hydrogen cyanide and solid sodium cyanide. It is more easily assayed, measured and metered than the solid material and it may be shipped and transferred with greater ease and less danger. Conversion of hydrogen cyanide to this end product also eliminates the fire and explosion hazards in the storage and handling of liquid hydrogen cyanide. In addition, enough applications for the aqueous sodium cyanide solutions exist to provide a profitable market for this commodity.

In common practice, aqueous sodium cyanide is produced by introducing liquid hydrogen cyanide into a suitable reactor containing caustic having a concentration in the range from 23–30% until almost all the caustic is reacted. The rate of addition of the cyanide must be controlled carefully and the reactor contents must be continuously and thoroughly agitated to insure immediate reaction and prevent accumulation of free hydrogen cyanide which will rapidly polymerize causing discoloration of the solution. Free caustic of the order of from about 0.2% to about 2% is left in the product solution to ensure that the stoichiometric end-point is not exceeded and to inhibit color formation. The course of the reaction is ordinarily followed by frequent density determinations until the end-point is approached. The final addition of cyanide required is calculated from a titrimetric analysis. This method is both laborious and time-consuming.

It has now been discovered that a correlation exists between the free caustic content of the aqueous sodium cyanide solution and the electroconductivity of the solution when measured under given dilution conditions. The following table shows the observed values for the electroconductivities of a 30% (by weight) solution of sodium cyanide in water containing varying amounts of free caustic.

| Sample No. | NaOH (percent by wt.) | Observed Conductivity (Mho × 10⁵) |
|---|---|---|
| Blank | None | 6.112 |
| 1 | 0.400 | 6.345 |
| 2 | 0.768 | 6.456 |
| 3 | 1.382 | 6.780 |
| 4 | 1.855 | 6.935 |
| 5 | 2.07 | 6.882 |
| 6 | 2.65 | 7.148 |

These values were obtained by diluting the sample of the cyanide solution 100 to 1 with pure water and using a conductance cell connected to an alternating current bridge and a null potentiometer.

The principal object of this invention, therefore, is to provide a simple, sensitive, automatic and inexpensive method of controlling the reaction of hydrogen cyanide and sodium hydroxide to produce aqueous solutions of sodium cyanide containing specified amounts of free caustic. This and other objects and advantages of the invention will become apparent from the following description of a specific embodiment of the invention taken in connection with the attached drawing.

The drawing is a simplified diagrammatic flow sheet of the improved process of the invention.

The reaction vessel 1 equipped with an agitator 2 is charged with caustic through line 3. The vessel may also contain baffles or other such devices to improve mixing and agitation of the reactants. The concentration of caustic charged is about 30%, the exact concentration being dependent on the desired sodium cyanide content of the product solution which generally varies from 28 to 35%. Liquid hydrogen cyanide is fed from a metering tank 4 through line 5 which connects with the dip-tube 6. The rate of addition of hydrogen cyanide is controlled through the use of a flow control valve assembly 7 in the feed line 5. As the quantity of hydrogen cyanide added nears the stoichiometric point as indicated by the metering tank level, a stream of the solution in the reactor is withdrawn through line 8, diluted about 100 to 1 with pure water from tank 9, by means of proportioning pump 10, and passed into unit 11 where its electroconductivity is measured. The overflow from the unit 11 may be returned to the reactor through line 12. A signal is generated in the unit 11 corresponding to the value of the electroconductivity of the sodium cyanide-caustic solution. This signal is transmitted through line 13 to an indicating conductivity recorder 14 to provide a direct scale reading indicative of the free caustic content of the solution. When the reading reaches a predetermined value, usually in the range from 0.2% to 2% free caustic, the hydrogen cyanide feed is shut off either manually or automatically. If control is to be automatic, when the free caustic reaches the predetermined level or value, a suitable signal is transmitted through line 15 to controller 16 and a control signal is generated therein, which may be electric, pneumatic, hydraulic or any other recognized medium, which is transmitted to the flow control valve assembly 7 closing it and discontinuing the hydrogen cyanide feed. The finished batch is then pumped to storage via line 19.

Instruments designated in the system by numerals 11, 14, and 16 are standard and well known to those skilled in the art. The electroconductivity unit 11, for example, may comprise a standard alternating current Wheatstone bridge arrangement including a conductance cell and a null potentiometer. The conductance cell is a sealed glass chamber of an appropriate size to measure high conductance into which are inserted two platinum electrodes. The glass tube is open at the bottom and the top with a perforated wall for passage of the solution therethrough. Controller 16, operatively connected to recorder 14 through line 15 may include a solenoid-operated valve capable of admitting air through line 18 to line 17. Flow control valve assembly 7 could suitably be an air-operated slide valve.

The dilution of the sample of the reactor solution which is directed through the electroconductivity cell is not highly critical. While a dilution ratio of water to solution of 100:1 is preferred, ratios from 50:1 to 150:1 and even higher can be used.

What is claimed is:

In a process for the preparation of an aqueous sodium cyanide solution containing from about 0.2% to about 2.0% by weight of free sodium hydroxide by the addition of hydrogen cyanide to an aqueous sodium hydroxide solution having a concentration of about 30%, the method of controlling said reaction near the stoichiometric point to maintain the concentration of said free hydroxide within said range which comprises withdrawing a sample of said aqueous sodium cyanide solution from the reaction vessel, diluting said solution about 100:1 with pure water, passing said diluted solution through an electroconductivity device, measuring the electroconductivity of the solution, regulating the addition of hydrogen cyanide to sodium hydroxide with respect to a predetermined electroconductivity setting; and recovering an aqueous sodium cyanide solution containing from about 0.2% to about 2% by weight of free sodium hydroxide.

References Cited in the file of this patent
UNITED STATES PATENTS

| | | |
|---|---|---|
| 1,951,035 | Parker | Mar. 13, 1934 |
| 2,668,097 | Hallikainen | Feb. 2, 1954 |
| 2,838,378 | Shawhan | June 10, 1958 |
| 2,876,066 | Inman | Mar. 3, 1959 |